United States Patent
Brzoska et al.

(10) Patent No.: US 8,345,266 B2
(45) Date of Patent: Jan. 1, 2013

(54) METHOD AND SYSTEM FOR MEASURING WEAR IN THE LINING OF A VESSEL

(75) Inventors: David E Brzoska, Independence, OH (US); James E Yanker, Easton, PA (US)

(73) Assignee: Specialty Minerals (Michigan) Inc., Bingham Farms, MI (US)

(*) Notice: Subject to any disclaimer, the term of this patent is extended or adjusted under 35 U.S.C. 154(b) by 549 days.

(21) Appl. No.: 12/050,744

(22) Filed: Mar. 18, 2008

(65) Prior Publication Data

US 2009/0237678 A1  Sep. 24, 2009

(51) Int. Cl.
G01B 11/30 (2006.01)
G01B 11/24 (2006.01)

(52) U.S. Cl. ........................ 356/608; 356/601

(58) Field of Classification Search .................. None
See application file for complete search history.

(56) References Cited

U.S. PATENT DOCUMENTS

| | | | |
|---|---|---|---|
| 4,893,933 A | | 1/1990 | Neiheisel et al. |
| 5,127,736 A | * | 7/1992 | Neiheisel ............ 356/602 |
| 5,212,738 A | | 5/1993 | Chande et al. |
| 5,546,176 A | * | 8/1996 | Jokinen ............ 356/5.1 |
| 5,570,185 A | | 10/1996 | Jokinen et al. |
| 6,780,351 B2 | * | 8/2004 | Wirth, Jr. ............ 264/30 |
| 6,922,251 B1 | | 7/2005 | Kirchhoff et al. |
| 6,922,252 B2 | * | 7/2005 | Harvill et al. ............ 356/630 |
| 7,924,438 B2 | * | 4/2011 | Kleinloh et al. ............ 356/601 |
| 2004/0056217 A1 | * | 3/2004 | Harvill et al. ............ 250/559.22 |
| 2009/0303494 A1 | * | 12/2009 | Kleinloh ............ 356/614 |
| 2010/0158361 A1 | * | 6/2010 | Grafinger et al. ............ 382/165 |

FOREIGN PATENT DOCUMENTS

| | | | |
|---|---|---|---|
| JP | 59143905 A | * | 8/1984 |
| JP | 60235005 A | * | 11/1985 |
| JP | 06200309 A | * | 7/1994 |
| JP | 2007040736 A | * | 2/2007 |
| WO | WO 94/06032 | | 3/1994 |
| WO | WO94/06032 A1 | | 3/1994 |
| WO | WO2007/064928 A2 | | 6/2007 |

OTHER PUBLICATIONS

International Search Report dated May 8, 2009 from corresponding PCT Application No. PCT/US09/01711.

* cited by examiner

*Primary Examiner* — Gordon Stock, Jr.
(74) *Attorney, Agent, or Firm* — Derek S. Jessen; Leon Nigohosian, Jr.

(57) ABSTRACT

In a method and system for measuring wear in the lining of a vessel by a laser contouring system having an electromagnetic radiation emitting and receiving device. The laser contouring system references permanent marks and temporary marks positioned outside, on, or within the vessel. The distances and direction from the electromagnetic radiation emitting and receiving device to the fixed and temporary marks is determined during an initial measurement by the electromagnetic radiation emitting and receiving device from a first scanning position. The electromagnetic radiation emitting and receiving device is then moved along a path from the first scanning position to a second scanning position wherein some of the marks which were scanned from the first scanning position are scanned again to determine the relative position of the vessel and points on the internal lining of the vessel to determine the contour of the lining.

23 Claims, 14 Drawing Sheets

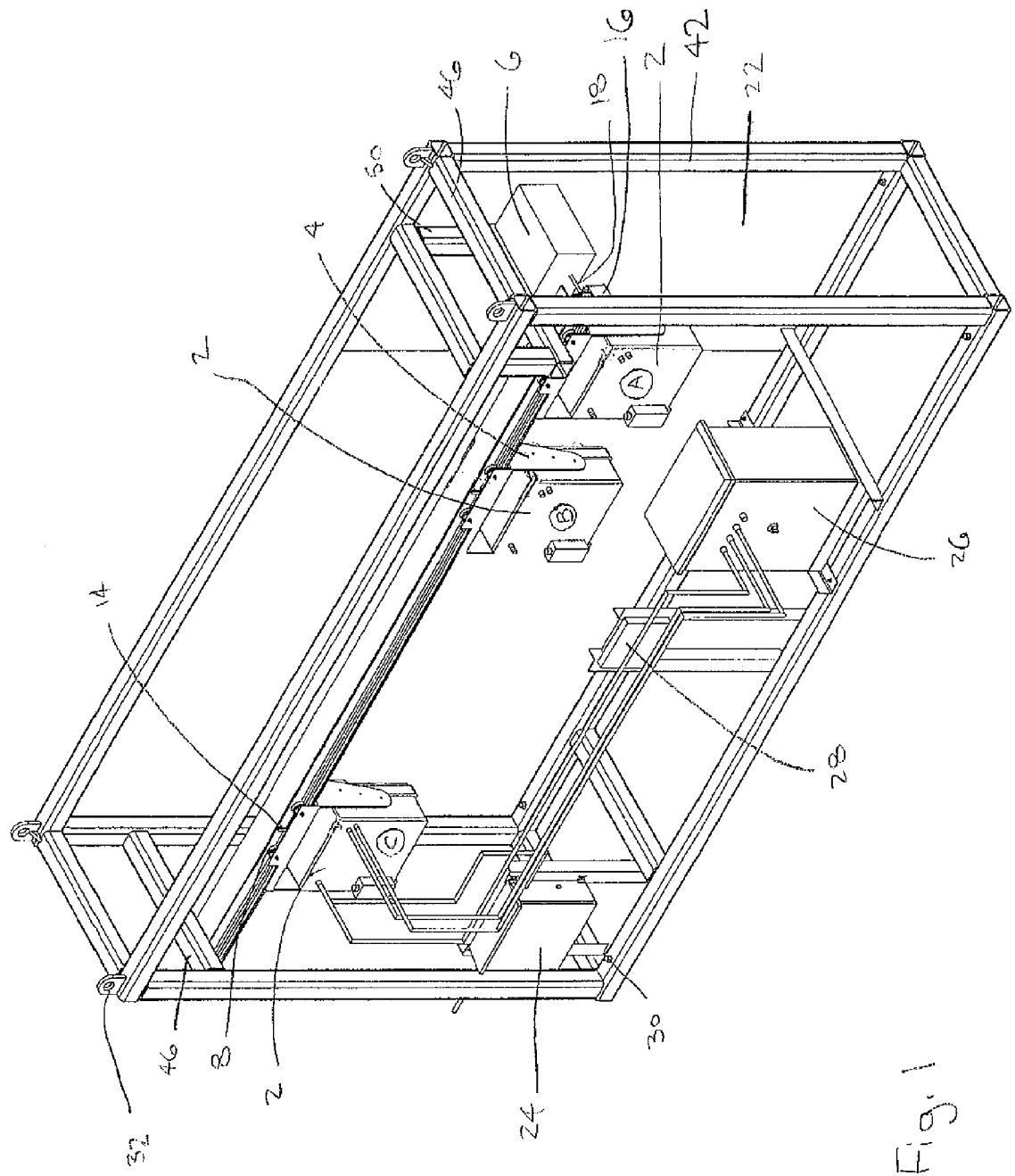

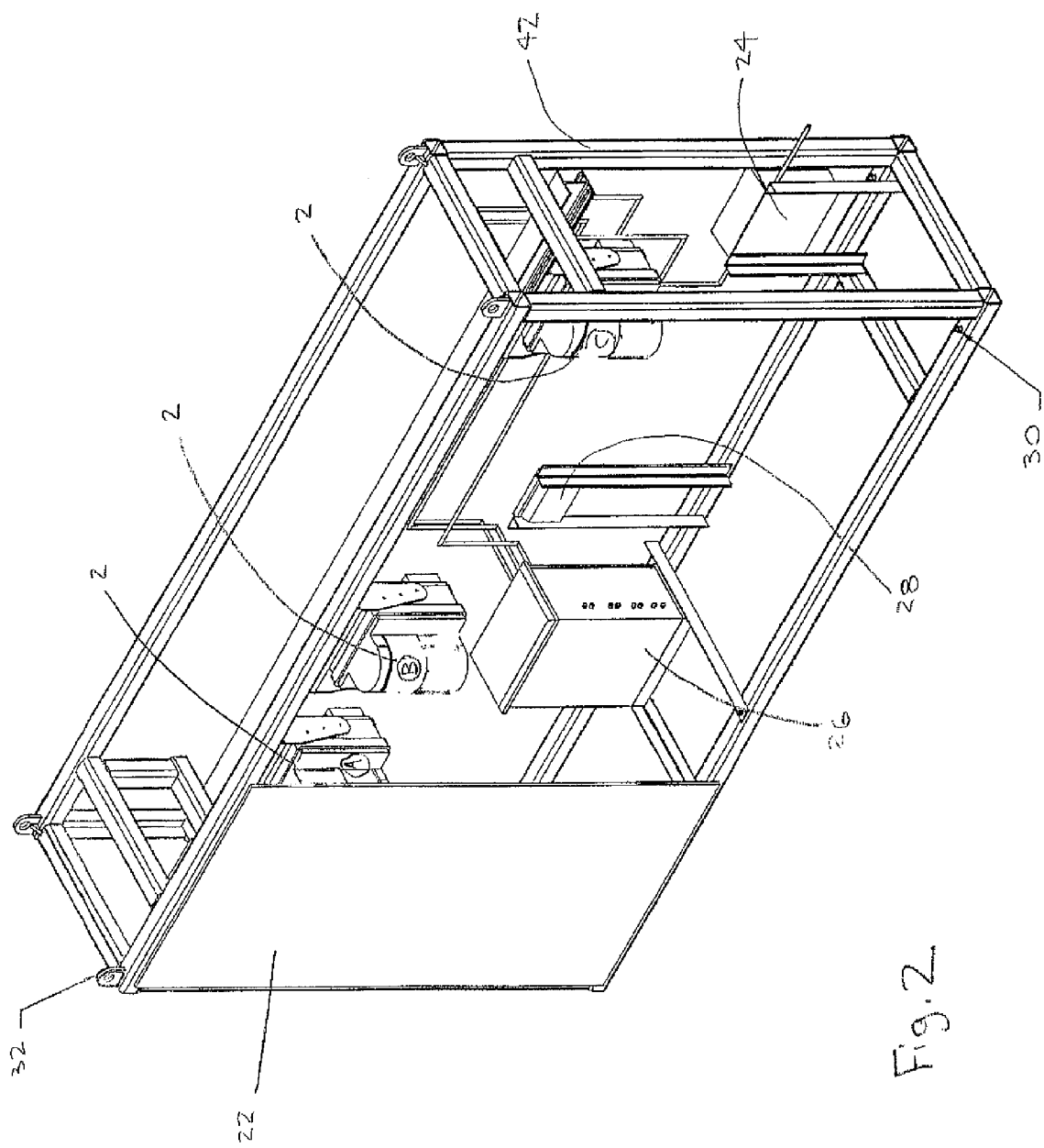

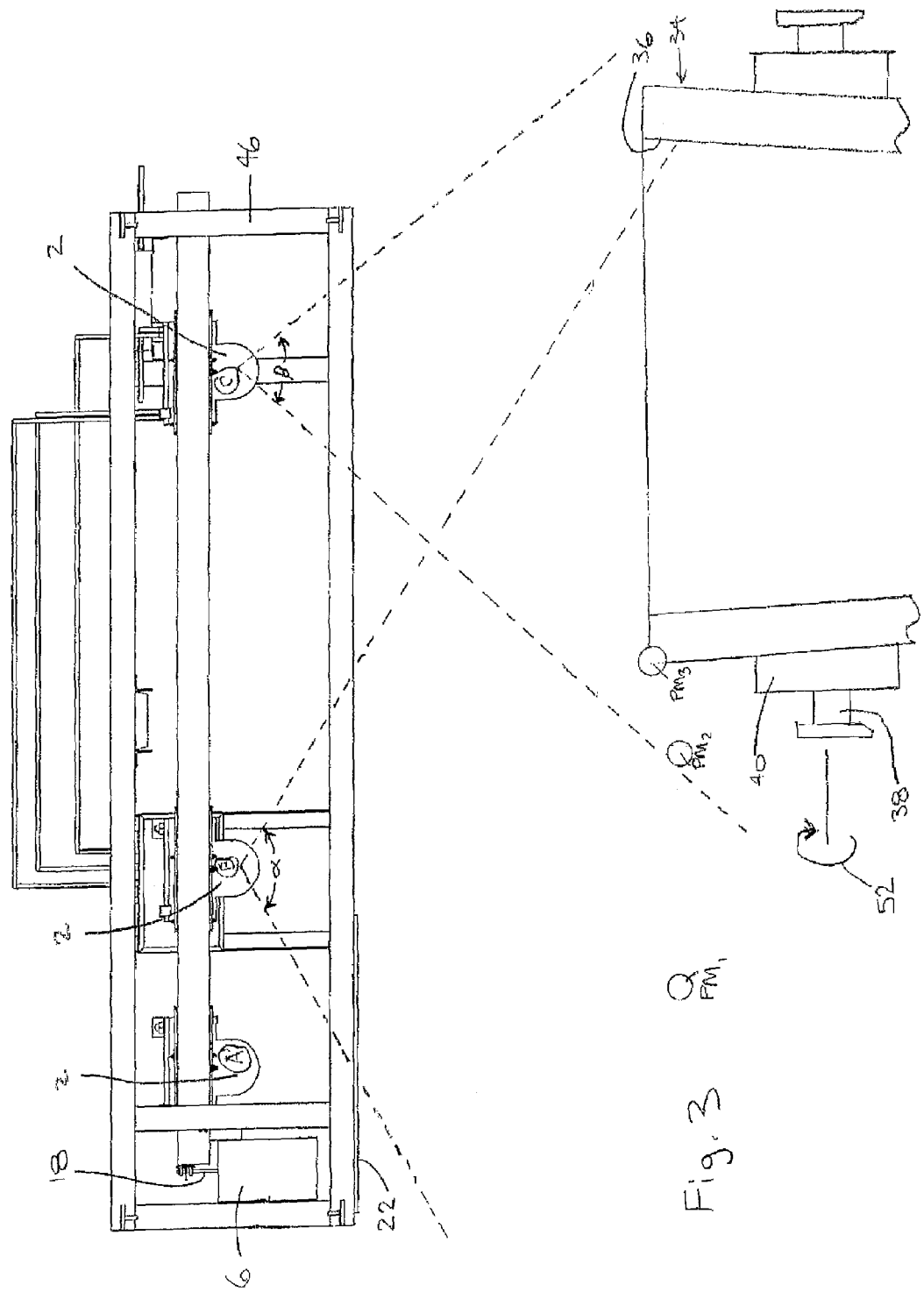

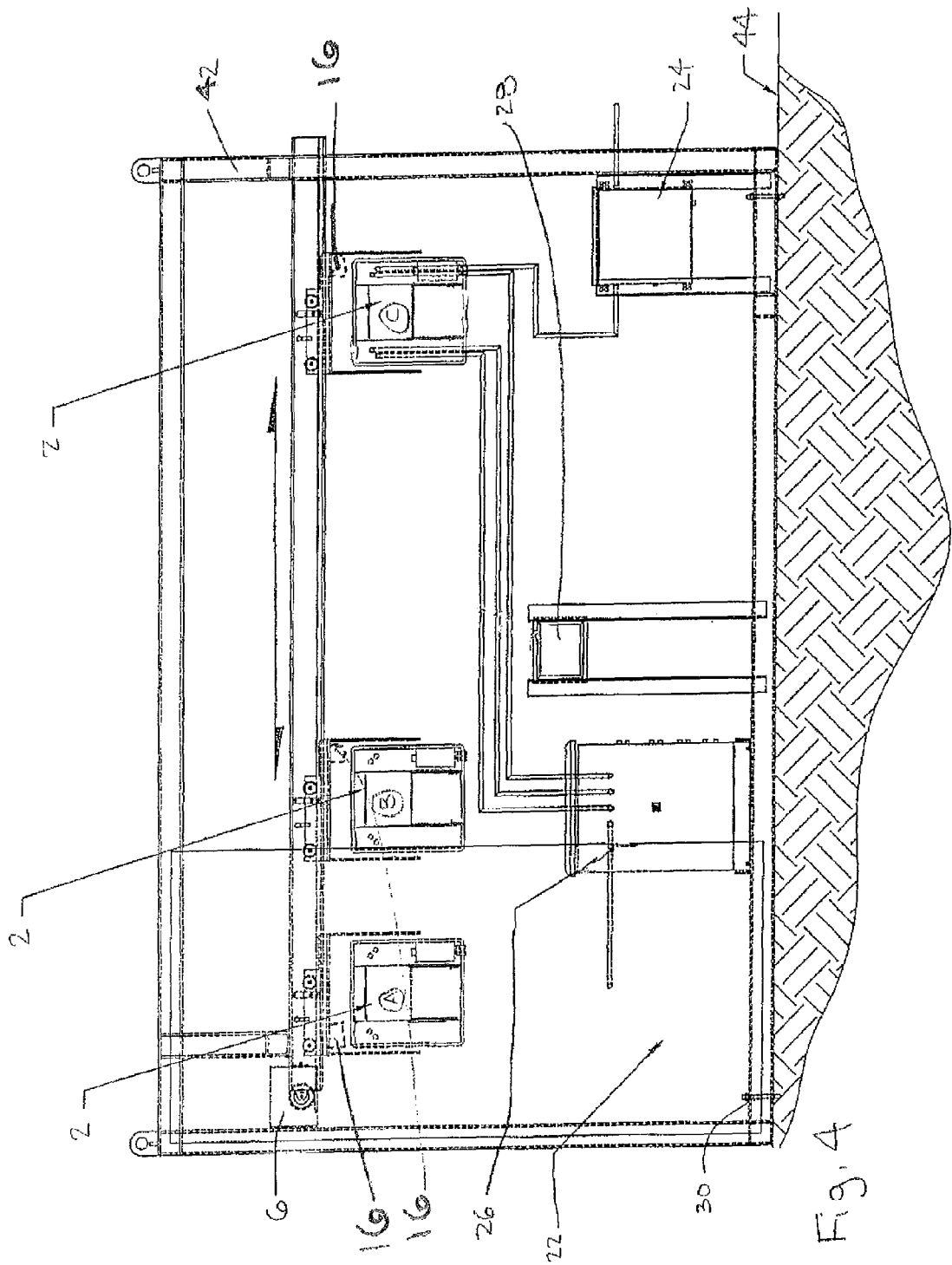

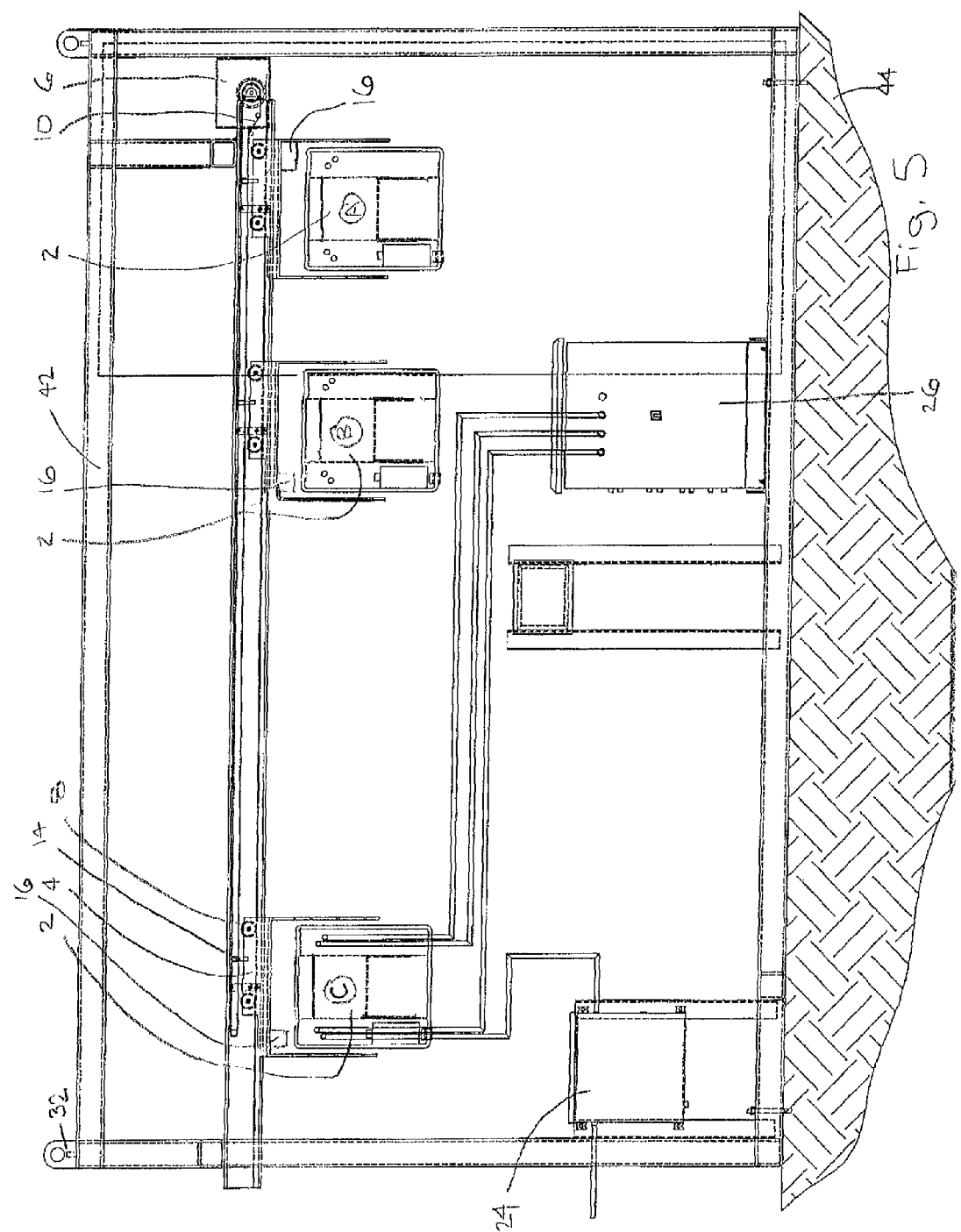

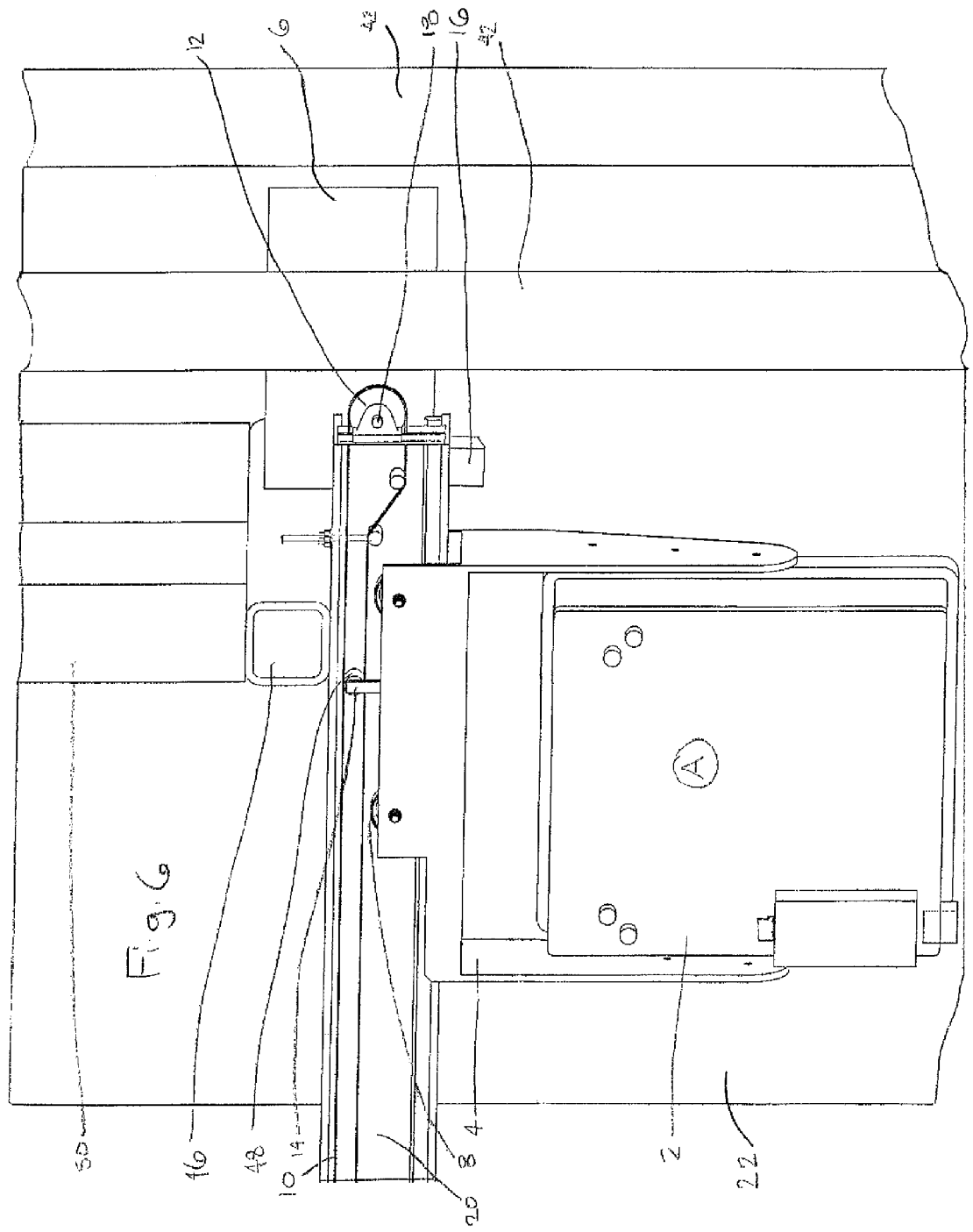

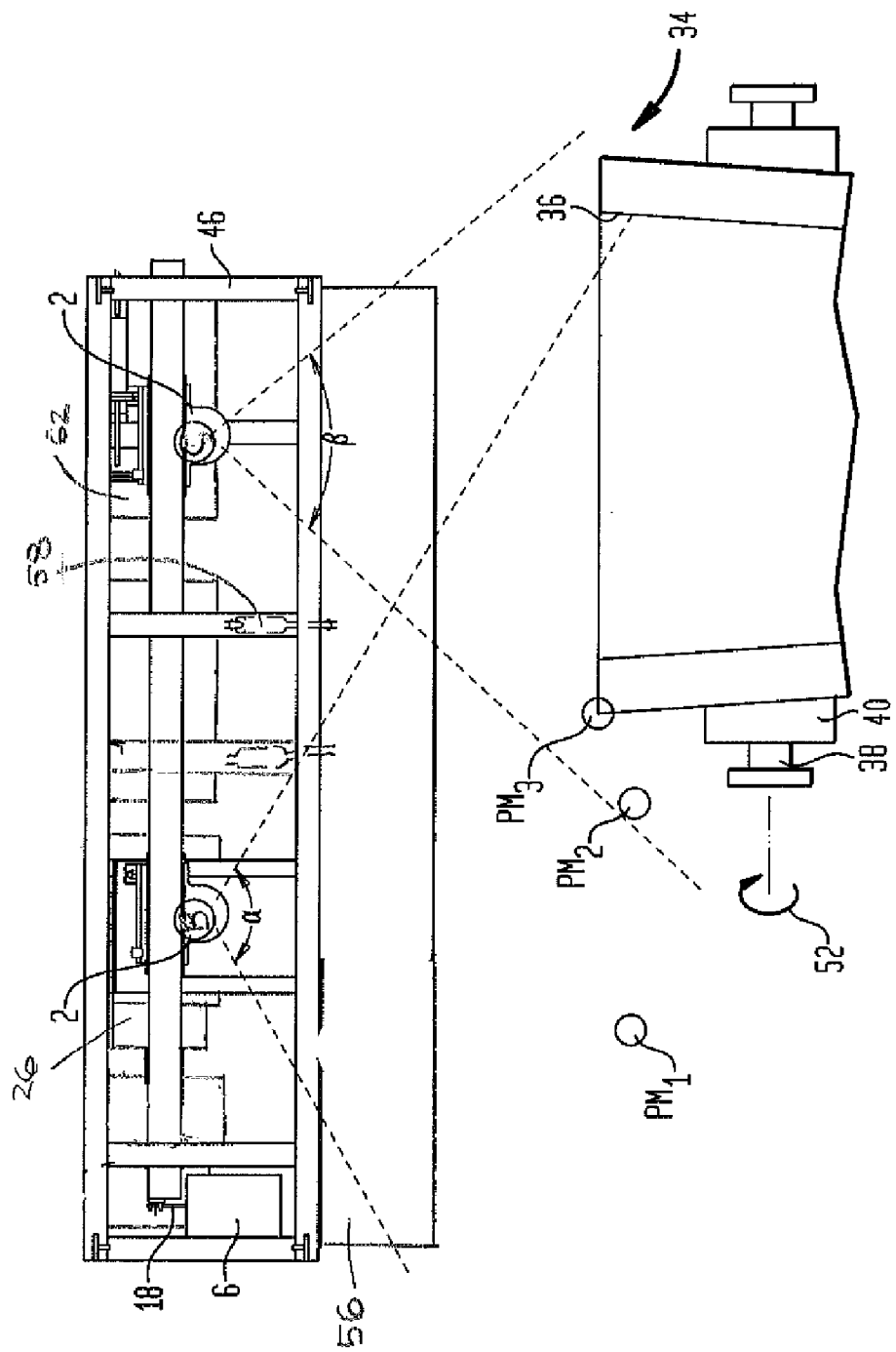

METHOD AND SYSTEM FOR MEASURING WEAR IN THE LINING OF A VESSEL

BACKGROUND

The invention relates to a method for measuring wear in the lining of a metallurgical vessel, for example, a ladle or a basic oxygen furnace.

It is extremely important to measure wear in the lining of ladles or basic oxygen furnaces or other industrial containers which are used for example in the steel making process. This renders it possible to optimize the service life of the container and to prevent excessive wear in the lining from causing risks pertaining to production or industrial safety. As an example, wear linings of basic oxygen furnaces must be renewed relatively often, as their life time varies, depending on what is melted in the basic oxygen furnace, on the material of which the lining is made, and naturally on the number of melts for which the basic oxygen furnace is used.

The wear in a lining is measured by a method based on measuring the time of flight or the phase shift of a laser beam. The laser beam is directed to the lining on the inner surface of the basic oxygen furnace, from which it is reflected back to the measuring device. In the method based on measuring the time of flight, the distance between the measuring device and each measured point on the lining to be measured in the coordinate system of the measuring device can be calculated on the basis of the time difference between the emitting time and the return time of the laser beam. The measured points define the wear profile of the lining, which may be output for instance to a display terminal, by which the wear profile measured from a basic oxygen furnace in process can be compared graphically and numerically with the profile that was measured on the safety lining of the container or the working lining before the container was actually brought into use, i.e. before the first melt.

To measure wear in the lining of three-dimensional objects, such as basic oxygen furnaces, ladles and other containers used in industrial applications, by non-contacting methods, such as laser measurement, requires that the measuring device and the object to be measured are represented in the same coordinate system. Combining the coordinate systems of the measuring device and the object to be measured is called fixing. In other words, the measuring device is positioned or fixed in relation to the object. For fixing it is necessary to use three or more permanent marks, with the laser beam of the measuring device being directed sequentially towards each permanent mark, and the coordinates of each permanent mark are measured in the coordinate system of the measuring device. Even if the measuring device has a fixed position in the vicinity of the container through permanent marks, it is advisable to perform fixing for each lining measurement again, which ensures a change in the ambient conditions and other factors not to cause any errors.

In the so-called direct method normally used for positioning or fixing, stationary fixing points, also called permanent marks, are part of the object to be measured, or can be mounted to the object, or in the vicinity of the object. By means of the permanent marks the coordinate systems of the object and the measuring device can be mathematically combined. In the direct method, the object to be measured and the measuring device can be included into the same coordinate system by measuring at the same time both the permanent marks and the points to be actually measured.

In a special case where the object to be measured is supported by a tilt axis, indirect angle measurement fixing can be applied, with the permanent marks being located on the container or outside of the container. An angle measuring device can be mounted, for example, to the tilt axis of the container or can be mounted elsewhere to the container. An example of such measuring device is a so-called inclinometer or tilt sensor. At present, fixing by means of angle measurement is an indirect method which is used when it is difficult to provide the object to be measured with necessary fixing points which are clearly visible and which position can not be recognized otherwise. Angle measurement fixings have been performed using fixing points on the container or on structures outside the object to be measured and using an angle value obtained from the angle measurement device, whereby the coordinate systems could be mathematically combined. The permanent marks are attached to the container or to the frame structures of a factory wall, for example, in vicinity to the basic oxygen furnace. When angle measurements were used in the known methods, the angle measurement device informs the measuring device of the position of the object or container in relationship to the known surroundings.

In both direct and indirect angle measurement fixing methods, the permanent marks can be, for example, small plates, cylinders, spheres or other regularly shaped objects made from a material which reflects laser radiation.

EP 1 234 193 B1, which has a counterpart U.S. Pat. No. 6,922,251 the entire specification of which is incorporated by reference to Kirchhoff et al. discloses a method for measuring the refractory lining of a metallurgical container by means of a laser scanner wherein the laser scanner is positioned centrally in front of the container in preparation of the measuring step to establish a precise definition of the position of the laser scanner relative to the container with the aid of permanent marks attached to the said container. Once the container has been emptied, measuring of the interior of the container can be performed in that a laser beam which can be deflected horizontally and vertically scans the inner surface of the container. The laser beams reflected from the refractory lining are received and are processed in accordance with their time of flight. Since also the position of the receiver is well known relative to the laser head and the respective angle position of the laser head has been determined for each individual laser beam, the shape of the surface of the refractory lining can be reconstructed from the data generated. Advantageously the container is not only scanned in its horizontally tilted position, but scanning is also done in two additional tilted positions, for example 20° upwards and approximately 20° downwards to make possible scanning the entire interior of the vessel.

After the central scan of the refractory lining, also a left and right scan can be performed in the method known from EP 1 234 193 B1 to also scan the entire side wall near the opening of the vessel by moving the laser scanner into left or right positions with respect to the vessel. The laser scanner has to be moved because the vessel can be tilted about its horizontal axis only but not to the left or right.

SUMMARY

The present invention is directed to a method and a system for measuring the refractory lining of a vessel, e.g. a steel ladle, by means of a laser scanner which comprises a laser head for emitting laser beams which can be deflected in vertical and horizontal directions and a receiving means in the vicinity of the laser head for receiving the laser beams reflected from the refractory lining to determine their directions and their time of flight.

In the method of the present invention the electromagnetic radiation emitting and receiving device can be a laser scanner and receiving means for receiving electromagnetic radiation reflected by an object. The electromagnetic radiation emitting and receiving device is moved along a predetermined path from a first scanning position to a second scanning position. From the first scanning position the electromagnetic radiation emitting and receiving device scans at least two marks which have a known position in relation to the vessel. The marks can be permanent. The marks used for position determination of the laser scanner can be part of a structure such as the building in which the vessel is located or part of the vessel. The marks can be cylinders, spheres or other unmovable marks which are secured to the building or to the floor of the building. The marks need not be separately positioned or attached bodies as it suffices that they are part of a structure such as the building in which the vessel is located. When the marks are permanent such as marks on a building which does not change its position, the marks can be scanned by the laser beam so that a precise position of the marks can be determined by the laser scanner.

The marks can be fixed marks positioned in front of the vessel prior to terminating the production process or alternatively, certain incidental structures on or within the container such as slag or funnels or craters formed by nozzles within the refractory lining. From the scanning data, the position of the marks in relationship to the coordinate system of the laser scanner is determined so that the position of the marks can be calculated in the coordinate system of the vessel or vessel tilt axis.

The precise position and heading of the laser scanner in relation to the coordinate system of the vessel is established by measuring the distance of the laser scanner with respect to the positions of previously installed and defined marks. This initially mapped precise position of the laser scanner will be referred to herein as the first scanning position of the laser scanner or electromagnetic radiation emitting and receiving device.

From the second scanning position, the refractory lining is scanned by the electromagnetic radiation emitting and receiving device along with at least two marks which were previously scanned during the position scan from the first scanning position.

Thereafter, when the laser scanner is moved to the second scanning position in front of the vessel by also simultaneously scanning at least two of the marks which were scanned in the first scanning position the new position and heading of the laser scanner from the second scanning position to the coordinate system of the vessel or vessel axis can be calculated. By scanning from the second scanning position the at least two marks which were scanned from the first scanning position, the position of the two rescanned marks within the coordinate system of the laser scanner is simultaneously calculated. From the point data generated by the laser beam scans, the vessel tilt angles, if applicable, and the laser scanner positions, the internal contour of the refractory lining of the vessel is derived.

The means for determining of an initial reference position and heading of the electromagnetic radiation emitting and receiving device in the coordinate system in relation to the first mark, second mark and third mark and determining of the position of the at least two marks which were scanned from the second scanning position based on the scanning of the at least two marks from the first scanning position and determining of the internal contour of the refractory lining of the vessel from data generated by the scanning of the plurality of points on the internal contour of the refractory lining of the vessel of the present system for measuring wear in a refractory lining can be a contouring system 78 as shown in FIG. 8 as described in U.S. Pat. No. 7,924,438 which has the data acquisition and processing device as described in U.S. Pat. No. 8,922,251 to Kirchoff. The data acquisition and processing device of Kirchoff is for acquiring the angles in two mutually perpendicular directions at which the electromagnetic radiation has been emitted, and the transit time, and also for storing previously known or determined spatial structures and for comparing spatial structures measured through acquisition of the angles and the transit time with the previously known or determined structures in order to determine the present position of the measured structures. The contouring system of U.S. Pat. No. 7,924,438 is directed to a laser contouring system which scans and references permanent marks and marks positioned near or on the vessel. The distances from the movable cart to each of the marks is determined during an initial measurement by the contouring system. Every time the cart is moved and a new measurement is taken, the contouring system scans the vessel and the temporary marks but not all the permanent marks.

In another embodiment of the present invention, from the second scanning position, the refractory lining is scanned by the electromagnetic radiation emitting and receiving device along with at least one mark which was previously scanned during the position scan from the first scanning position.

Thereafter, when the laser scanner is moved to the second scanning position in front of the vessel by also simultaneously scanning at least one of the marks which were scanned in the first scanning position the new position and heading of the laser scanner from the second scanning position to the coordinate system of the vessel or vessel axis can be calculated. By scanning from the second scanning position the at least one mark which was scanned from the first scanning position, the position of the rescanned mark within the coordinate system of the laser scanner is simultaneously calculated. From the point data generated by the laser beam scans, the vessel tilt angles, if applicable, and the laser scanner positions, the internal contour of the refractory lining of the vessel is derived. In the case in which the vessel is tilted in the time between scanning from the first scanning position and scanning from the second scanning position, measurement of the refractory lining can be made if the vessel tilt angle is determined, for example, by an inclinometer or tilt sensor.

In another embodiment of the present invention, the electromagnetic radiation emitting and receiving device is moved along the predetermined path to a third, fourth or more scanning positions. From the above-mentioned third, fourth or more scanning positions, the refractory lining is further scanned by the electromagnetic radiation emitting and receiving device. In the case in which the vessel is tilted in the time between scanning from the first scanning position and scanning from any one or more of the second, third, fourth or more scanning positions, measurement of the refractory lining can be made if the vessel tilt angle is determined, for example, by an inclinometer or tilt sensor.

In an embodiment of the method of the present invention, the production process within the vessel is terminated and the vessel is tilted into a position for measuring whereby the opening of the vessel is facing the laser scanner. The precise position and heading of the laser scanner in relation to the coordinate system of the vessel tilt axis is established by measuring the distance of the laser scanner with respect to the positions of previously installed and defined marks. The vessel is then scanned according to the above described method and the contour of the refractory lining in the coordinate system of the vessel is determined based on tilt angle data from the vessel obtained for example from an inclinometer or tilt sensor and the data from the scanning of the lining.

In another embodiment of the invention, the vessel can be tilted into two or more additional positions and additional scans of the refractory lining are made at each of the additional positions by repeating the steps described above.

The present invention also relates to a system for measuring the refractory lining of a vessel comprising an electromagnetic radiation emitting and receiving device for measuring electromagnetic radiation reflected back from a mark and determining the location of the mark in a coordinate system and a means for moving the electromagnetic radiation emitting and receiving device along a predetermined path from a first scanning position in which the electromagnetic radiation emitting and receiving device scans at least two marks or at least three marks of a known position to a second scanning position in which the electromagnetic radiation emitting and receiving device scans at least one of the marks which were scanned from the first scanning position along with a scanning of at least a portion of the refractory lining of the vessel.

In another embodiment of the invention, the electromagnetic radiation emitting and receiving device is placed in a park position for storage which can be behind a heat shield. The electromagnetic radiation emitting and receiving device is moved along a predetermined path from the park position to the first scanning position. The laser is then moved to the second scanning position and finally after scanning of the vessel, the electromagnetic radiation emitting and receiving device is moved back along the predetermined path to the park or rest position.

In another embodiment of the invention, the system for measuring wear in the refractory lining of a vessel can have a heat shield which can be selectively placed between the vessel and the electromagnetic radiation emitting and receiving device. When the heat shield is removed from in between the electromagnetic radiation emitting and receiving device and the vessel, the electromagnetic radiation emitting and receiving device can scan from a first scanning position the at least two or at least three marks and determine the initial reference position of the electromagnetic radiation emitting and receiving device and heading electromagnetic radiation emitting and receiving device. The electromagnetic radiation emitting and receiving device is moved along a predetermined path from the first scanning position to the second scanning position and the refractory lining is scanned while the heat shield is not present between the electromagnetic radiation emitting and receiving device and the vessel.

In another embodiment of the invention the means for moving the electromagnetic radiation emitting and receiving device along a predetermined path from a first scanning position to a second scanning position also moves the electromagnetic radiation emitting and receiving device to and from a park or rest position.

BRIEF DESCRIPTION OF THE DRAWINGS

The invention will now be described in connection with the drawings, in which:

FIG. 1 shows a parallel perspective view of the rear of an embodiment of the system of the present invention for measuring wear in a refractory lining showing the electromagnetic radiation emitting and receiving device or laser in the park position, the first scanning position and the second scanning position, FIG. 2 shows a parallel perspective view of the front of the system of FIG. 1 showing the laser in the park position, the first scanning position and the second scanning position, FIG. 3 shows a top view of the system of FIG. 1 showing the laser in the park position, the first scanning position and finally in the second scanning position during scanning of the refractory lining of the vessel wherein the vessel is shown in a sectional view, FIG. 4 is an elevational view of the front of the system of FIG. 1 showing the laser in the park position, the first scanning position and the second scanning position, FIG. 5 is an elevational view of the rear of the system of FIG. 1 showing the laser in the park position, the first scanning position and the second scanning position, FIG. 6 is a side view of a portion of the rear of the system of FIG. 1 showing the laser in the park position and behind a heat shield.

FIG. 10 shows a top view of the system of FIG. 8 showing the laser in the first scanning position and finally in the second scanning position during scanning of the refractory lining of the vessel wherein the vessel is shown in a sectional view.

DETAILED DESCRIPTION OF THE PREFERRED EMBODIMENTS

Figure 3A:
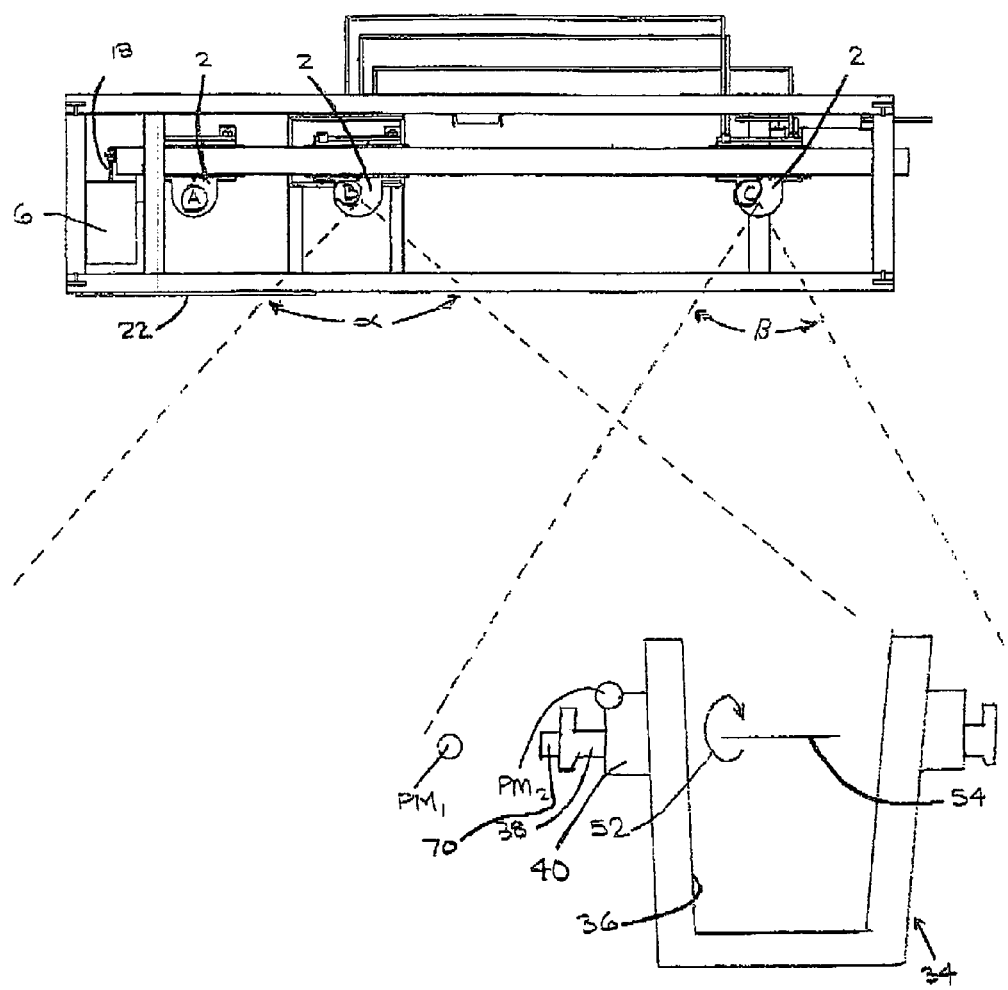
FIG. 3a shows a top view of another embodiment of the system of the present invention for measuring wear in a refractory lining showing the electromagnetic radiation emitting and receiving device or laser in the park position, the first scanning position and the second scanning position.

It is to be noted that in all figures same parts are provided with the same reference numerals. In particular, FIG. 1 shows the system of the present invention for measuring wear in a refractory lining showing the electromagnetic radiation emitting and receiving device 2 in the park position A, the first scanning position B and the second scanning position C. The means for moving the electromagnetic radiation emitting and receiving device 2 which can comprise a laser from the park position A to the first scanning position B is a trolley system having a trolley frame 4, rollers 8, chain 10 and motor 6. As the motor 6 drives disc 12 on motor shaft 18 as seen in FIG. 6 and chain 10 on disc 12 rotates wheel 48 on hanger bar 14 which supports trolley frame 4. The electromagnetic radiation emitting and receiving device 2 then moves along the predetermined path from the park position A to the first scanning position B and then from the first scanning position B to the second scanning position C.

The rollers 8 of the trolley system move along rail bar 20 which is supported by cross bars 46. Mounting bars 50 on frame 42 support cross bars 46.

The system can be provided with a means for determining when the electromagnetic radiation emitting and receiving device is located at the park position, the first scanning position and second scanning position such that the means moving the electromagnetic radiation emitting and receiving device stops the electromagnetic radiation emitting and receiving device at the respective park position, first scanning position and second scanning position based on a signal from the means for determining when the electromagnetic radiation emitting and receiving device is located at the park position, the first scanning position and second scanning position. The means for determining when the electromagnetic radiation emitting and receiving device is located at the park position, the first scanning position and second scanning position can be a proximity sensor, encoder or other positioning means. As shown in FIG. 6, proximity sensor 16 detects when the electromagnetic radiation emitting and receiving device 2 is positioned at each of the park position A, the first scanning position B and the second scanning position C. The proximity sensors 16 which sense the electromagnetic radiation emitting and receiving device 2 can be located along the rail bar 20 as shown in FIGS. 1 and 4. The proximity sensors 16 along the rail bar 20 can serve to stop the movement of the electromagnetic radiation emitting and receiving device 2 along the rail bar 20.

Figure 7:
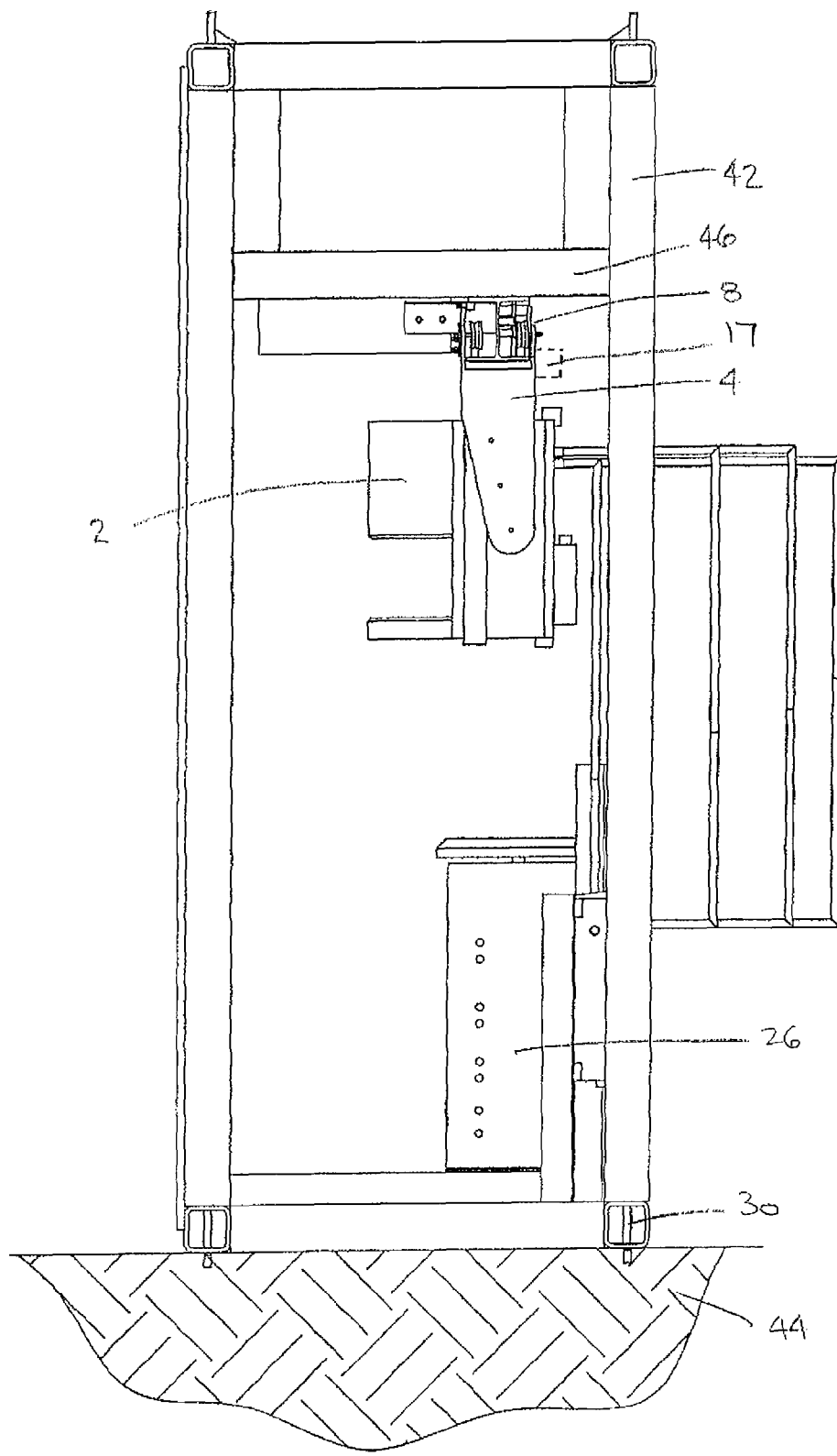
FIG. 7 is an elevational view of the right side of the system of FIG. 1.

The means for determining when the electromagnetic radiation emitting and receiving device 2 is located at the park position, the first scanning position and second scanning position can be encoder 17 in FIG. 7 which tracks motor 6 movement and thereby the position of the electromagnetic radiation emitting and receiving device 2 along the predetermined path of the electromagnetic radiation emitting and receiving device 2.

The means for detecting when the radiation emitting and receiving device 2 is positioned at each of the park position A, the first scanning position B and the second scanning position C can be a mechanical means. Such a mechanical means can be a means for calculating the number of distance units the radiation emitting and receiving device 2 has moved between the park position A, the first scanning position B and the second scanning position C. The mechanical means could track the sum total of the number of mechanical devices, each of which corresponds to a predetermined distance, which were detected by the mechanical means as the radiation emitting and receiving device 2 moved along the predetermined path, for example along rail bar 20.

The system for measuring wear in a refractory lining of the present invention can have a heat shield 22 or any other means for protecting the electromagnetic radiation emitting and receiving device 2 from heat or thermal radiation from a hot vessel.

The system for measuring wear in a refractory lining of the present invention can be provided with a support means for supporting the electromagnetic radiation emitting and receiving device 2 and the means for moving the electromagnetic radiation emitting and receiving device 2 from the first scanning position B to the second scanning position C. The support means can be a frame 42 having members arranged such that the members support the electromagnetic radiation emitting and receiving device 2 and the means for moving the electromagnetic radiation emitting and receiving device 2 from the first scanning position B to the second scanning position C. The members on the frame 42 which provide support can be mounting bars 50 on frame 42 support cross bars 46.

In another embodiment of the invention, the system for measuring wear in a refractory lining does not position the electromagnetic radiation emitting and receiving device 2 in a park position. The system for measuring wear in a refractory lining positions the electromagnetic radiation emitting and receiving device 2 in a first scanning position B and a second scanning position C. A moveable heat shield 22 can protect the electromagnetic radiation emitting and receiving device 2 prior to performing scanning from the first scanning position B. Before the electromagnetic radiation emitting and receiving device 2 scans from the first scanning position B the heat shield 22 can be moved out of a position in which the heat shield 22 protects the electromagnetic radiation emitting and receiving device 2 to a position where the electromagnetic radiation emitting and receiving device 2 is able to scan a vessel.

The electromagnetic radiation emitting and receiving device 2 can be moved along the predetermined path by any other positioning means or device which can be a mechanical device which moves the electromagnetic radiation emitting and receiving device 2 from the first scanning position B to the second scanning position C.

The system for measuring wear in a refractory lining can have a means for cooling 26 the electromagnetic radiation emitting and receiving device 2. The means for cooling the electromagnetic radiation emitting and receiving device 2 can be by supplying cooling water and an air supply to the electromagnetic radiation emitting and receiving device 2. Air can be supplied to the system for measuring wear in a refractory lining from air box 24 which can regulate the supply of air.

Where conditions make it necessary, other cooling means or methods can be provided such as plant cooling water or other closed loop cooling systems.

The system for measuring wear in a refractory lining can be provided with a video display 28 for showing the measured contour of the refractory lining 36 or vessel 34. An image of the contour of the refractory lining 36 can be transmitted to a remote video display. The system for measuring wear can be operated remotely by a high speed Ethernet link. The system for measuring wear in a refractory lining can be operated by a direct hardwired connection. A portion of connection between the operator or operators operating the system can be wireless.

The vessel which is scanned can be a ladle, a basic oxygen furnace or other industrial lining measurement application.

The system for measuring wear in a refractory lining of the present invention can be detachably mounted by means of a bolt assembly 30 or any other means for detachably mounting the system to a structure such as a plant floor 44, concrete pad or any other means for supporting the system. The system for measuring wear in a refractory lining of the present invention can be moved into another position by any means for moving the system such lifting lugs 32 after being detached from the supporting structure for the system.

FIG. 3 shows a scanning of a vessel 34 using the method for measuring wear in a refractory lining 36 of the present invention.

In one embodiment of the invention seen in FIG. 3, the electromagnetic radiation emitting and receiving device 2 first performs a position scan from a first scanning position B in which at least three marks, i.e. a first mark, $PM_1$ a second mark $PM_2$ and a third mark $PM_3$ are scanned. At least one of the first mark, $PM_1$ a second mark $PM_2$ and a third mark $PM_3$ has a known position in the coordinate system of the vessel 34. The marks can be permanent or temporary. For example, the marks can be on the trunion 38 or on the trunion block 40. Other marks in, on or outside of the vessel can be used. The angle $\alpha$ scanned by the electromagnetic radiation emitting and receiving device 2 can be from about 60 degrees to about 120 degrees. In another embodiment, the angle α can be from about 0 degrees to about 360 degrees.

It is to be noted that two marks can be sufficient for position determination. The electromagnetic radiation emitting and receiving device 2 first performs a position scan from a first scanning position in which at least two marks, i.e. a first mark, $PM_1$ a second mark $PM_2$ are scanned. At least one of the first mark, $PM_1$ and a second mark $PM_2$ have a known position in the coordinate system of the vessel 34.

A means for moving the electromagnetic radiation emitting and receiving device 2 from a first scanning position to a second scanning position such as the trolley system described above then moves the electromagnetic radiation emitting and receiving device 2 from a first scanning position B to a second scanning position C.

From the second scanning position C the electromagnetic radiation emitting and receiving device 2 scans the refractory lining of the vessel 34. The angle β scanned by the electromagnetic radiation emitting and receiving device 2 can be from about 20 degrees to about 100 degrees. During the scanning from the second scanning position C, at least two marks such as marks $PM_2$ and $PM_3$ which were previously scanned during scanning from the first scanning position B are again scanned from the second scanning position C. The position of the at least two marks which were scanned from the second scanning position C is determined based on the scanning of the at least two marks from the first scanning position B. By scanning at least two marks which were previously scanned in the first scanning position B, the location of the electromagnetic radiation emitting and receiving device 2 can be determined in the coordinate system of the vessel 34. Therefore, it is not necessary that the location of the electromagnetic radiation emitting and receiving device 2 be determined by reference to any sensors which have a known position on the system for measuring wear in a refractory lining of the present invention. Because the position of the electromagnetic radiation emitting and receiving device 2 in the coordinate system of the vessel 34 is known based on the scanning from the first scanning position B and the second scanning position C, it is not necessary that the position of the electromagnetic radiation emitting and receiving device 2 be determined by reference to any sensors along the predetermined path along which the means for moving the electromagnetic radiation emitting and receiving device 2 moves.

In another embodiment as seen in FIG. 3a, from the second scanning position C the electromagnetic radiation emitting and receiving device 2 scans the refractory lining of the vessel 34. The angle β scanned by the electromagnetic radiation emitting and receiving device 2 can be from about 20 degrees to about 100 degrees. During the scanning from the second scanning position C, at least one mark such as mark $PM_1$ which was previously scanned during scanning from the first scanning position B are again scanned from the second scanning position C. By scanning at least one mark which was previously scanned in the first scanning position B, the location of the electromagnetic radiation emitting and receiving device 2 can be determined in the coordinate system of the vessel 34. Therefore, it is not necessary that the location of the electromagnetic radiation emitting and receiving device 2 be determined by reference to any sensors which have a known position on the system for measuring wear in a refractory lining of the present invention. Because the position of the electromagnetic radiation emitting and receiving device 2 in the coordinate system of the vessel 34 is known based on the scanning from the first scanning position B and the second scanning position C, it is not necessary that the position of the electromagnetic radiation emitting and receiving device 2 be determined by reference to any sensors along the predetermined path along which the means for moving the electromagnetic radiation emitting and receiving device 2 moves.

In another embodiment of the method of the present invention, the production process within the vessel 34 is terminated and the vessel 34 is tilted around the tilt axis 54 in the direction of the arrow 52 into a position for measuring whereby the opening of the vessel 34 is facing the electromagnetic radiation emitting and receiving device 2. The precise position and heading of the electromagnetic radiation emitting and receiving device 2 in relation to the coordinate system of the vessel tilt axis is established by measuring the distance of the electromagnetic radiation emitting and receiving device 2 with respect to the positions of previously installed and defined marks. The vessel 34 is then scanned according to the above described method and the contour of the refractory lining 36 in the coordinate system of the vessel 34 is determined based on angle data from the vessel 34 obtained for example from an inclinometer 70 or tilt sensor if applicable and the data from the scanning of the refractory lining 36.

In another embodiment of the invention seen in FIGS. 8-12 measurement of the wear of the refractory lining 36 is performed without the electromagnetic radiation emitting and receiving device 2 being located at a park position. The electromagnetic radiation emitting and receiving device 2 first performs a position scan from a first scanning position B in which at least three marks, i.e. a first mark, $PM_1$ a second mark $PM_2$ and a third mark $PM_3$ are scanned. At least one of the first mark, $PM_1$ a second mark $PM_2$ and a third mark $PM_3$ has a known position in the coordinate system of the vessel.

A means for moving the electromagnetic radiation emitting and receiving device 2 from a first scanning position to a second scanning position such as the trolley system described above then moves the electromagnetic radiation emitting and receiving device 2 from a first scanning position B to a second scanning position C.

From the second scanning position C the electromagnetic radiation emitting and receiving device 2 scans the refractory lining 36 of the vessel 34. The angle β scanned by the electromagnetic radiation emitting and receiving device 2 can be from about 20 degrees to about 100 degrees. During the scanning from the second scanning position C, at least two marks such as marks $PM_2$ and $PM_3$ which were previously scanned during scanning from the first scanning position B are again scanned from the second scanning position C. The position of the at least two marks which were scanned from the second scanning position C is determined based on the scanning of the at least two marks from the first scanning position B. By scanning at least two marks which were previously scanned in the first scanning position B, the location of the electromagnetic radiation emitting and receiving device 2 can be determined in the coordinate system of the vessel 34.

The means for cooling the system for measuring wear in a refractory lining can be a Peltier cooler 26 as shown in FIGS. 8-12 and 2 which is a thermoelectric cooler which uses the Peltier effect. A Peltier cooler is a solid state heat pump which transfers heat from a hot side of a cooler to a cool side with the consumption of electricity. As shown, Peltier cooler 26 is a closed loop system which cycles a cooling media through the electromagnetic radiation emitting and receiving device 2.

Where conditions make it necessary, other cooling means or methods can be provided such as plant cooling water or other closed loop cooling systems.

Figure 8:
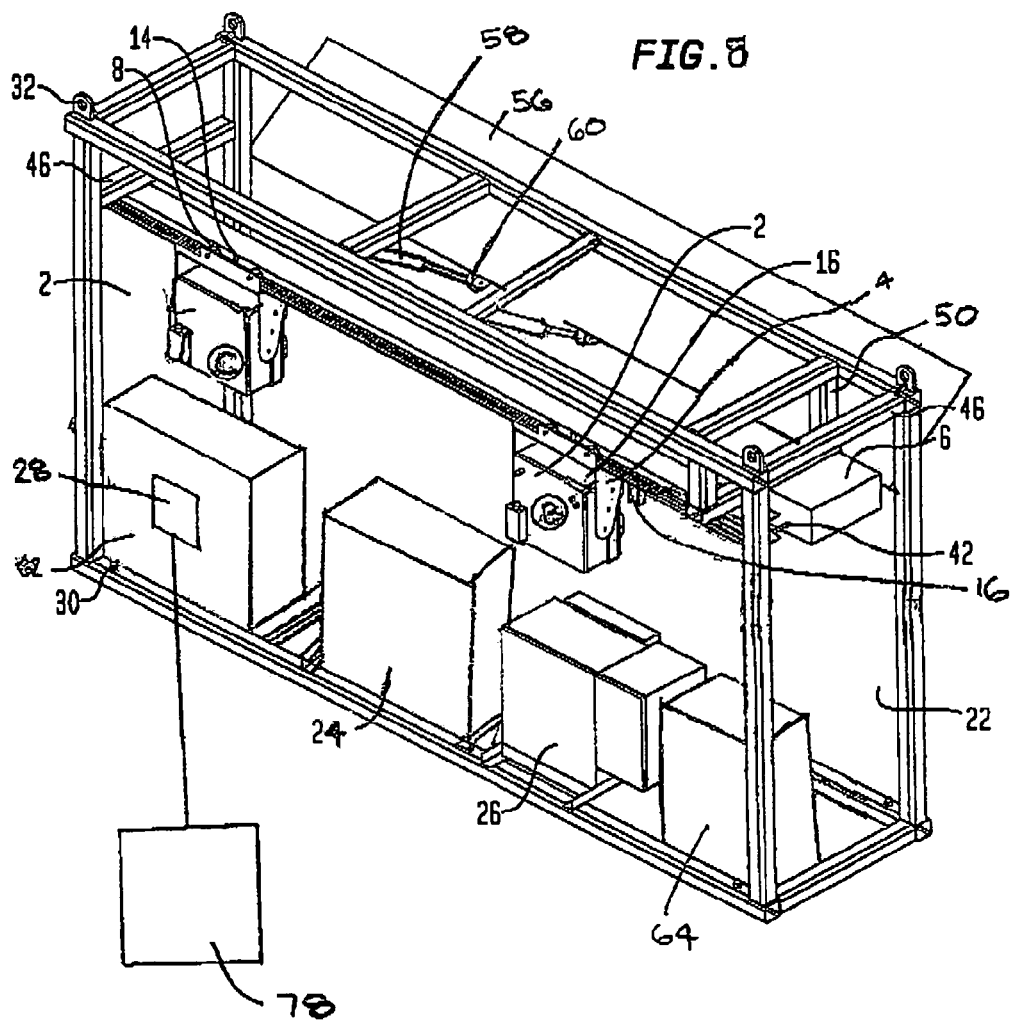
FIG. 8 shows a parallel perspective view of the rear of another embodiment of the system of the present invention for measuring wear in a refractory lining showing the electromagnetic radiation emitting and receiving device or laser in the first scanning position and the second scanning position.

As seen in FIG. 8, the system can be provided with a motor control enclosure 62 which is provided with a video display 28. Air box 24 can provide an air supply as necessary for any equipment. Also, terminal box 64 can provide any necessary Ethernet or electrical connections.

Figure 10A:
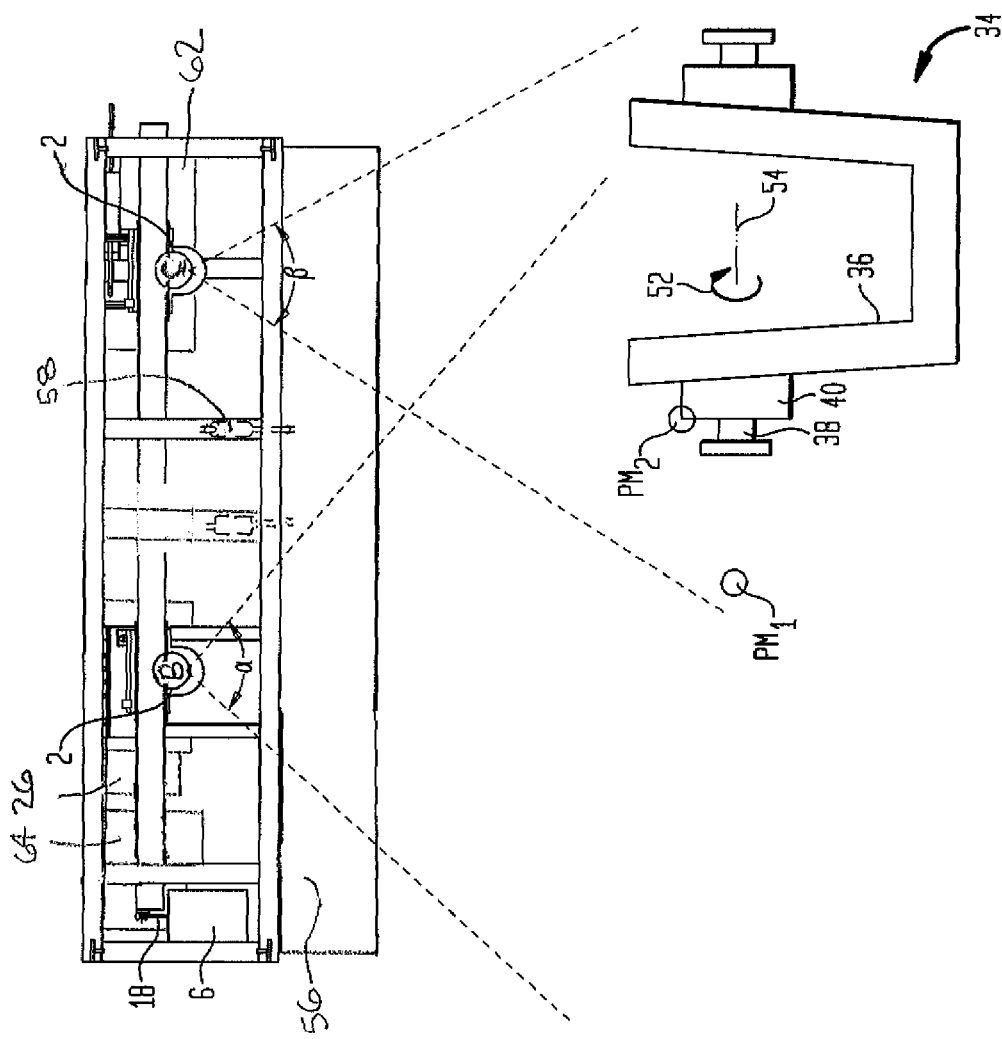
FIG. 10a shows a top view of another embodiment of the system of the present invention for measuring wear in a refractory lining showing the electromagnetic radiation emitting and receiving device or laser in the first scanning position and the second scanning position.
Figure 11:
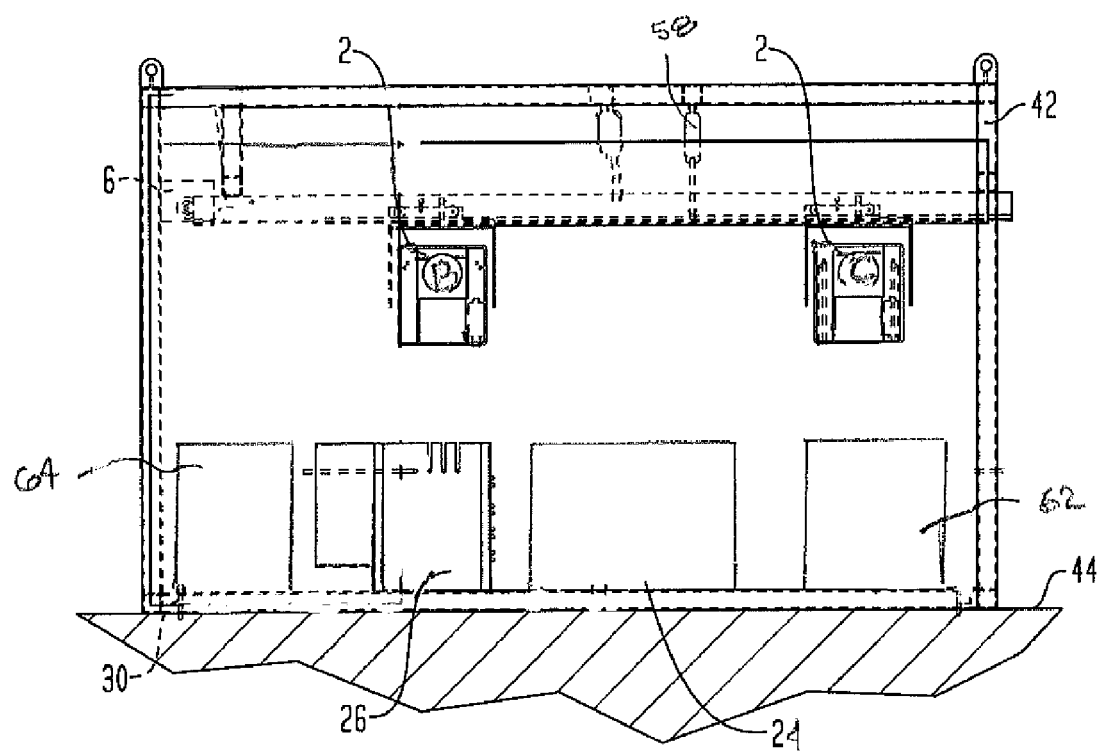
FIG. 11 is an elevational view of the front of the system of FIG. 8 showing the laser in the first scanning position and the second scanning position.
Figure 12:
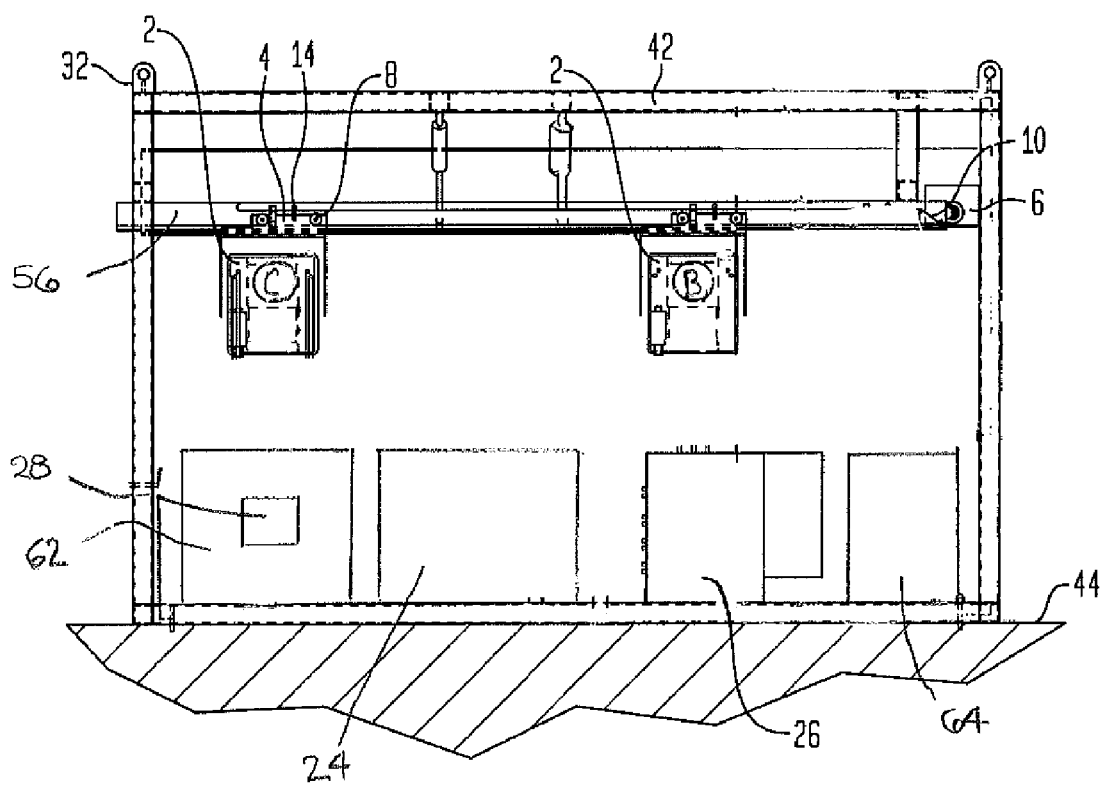
FIG. 12 is an elevational view of the rear of the system of FIG. 8 showing the laser the first scanning position and the second scanning position.

In another embodiment as seen in FIG. 10a, from the second scanning position C the electromagnetic radiation emitting and receiving device 2 scans the refractory lining of the vessel 34. The angle β scanned by the electromagnetic radiation emitting and receiving device 2 can be from about 20 degrees to about 100 degrees. During the scanning from the second scanning position C, at least one mark such as mark $PM_1$ which was previously scanned during scanning from the first scanning position B are again scanned from the second scanning position C. By scanning at least one mark which was previously scanned in the first scanning position B, the location of the electromagnetic radiation emitting and receiving device 2 can be determined in the coordinate system of the vessel 34. Therefore, it is not necessary that the location of the electromagnetic radiation emitting and receiving device 2 be determined by reference to any sensors which have a known position on the system for measuring wear in a refractory lining of the present invention.

Figure 9:
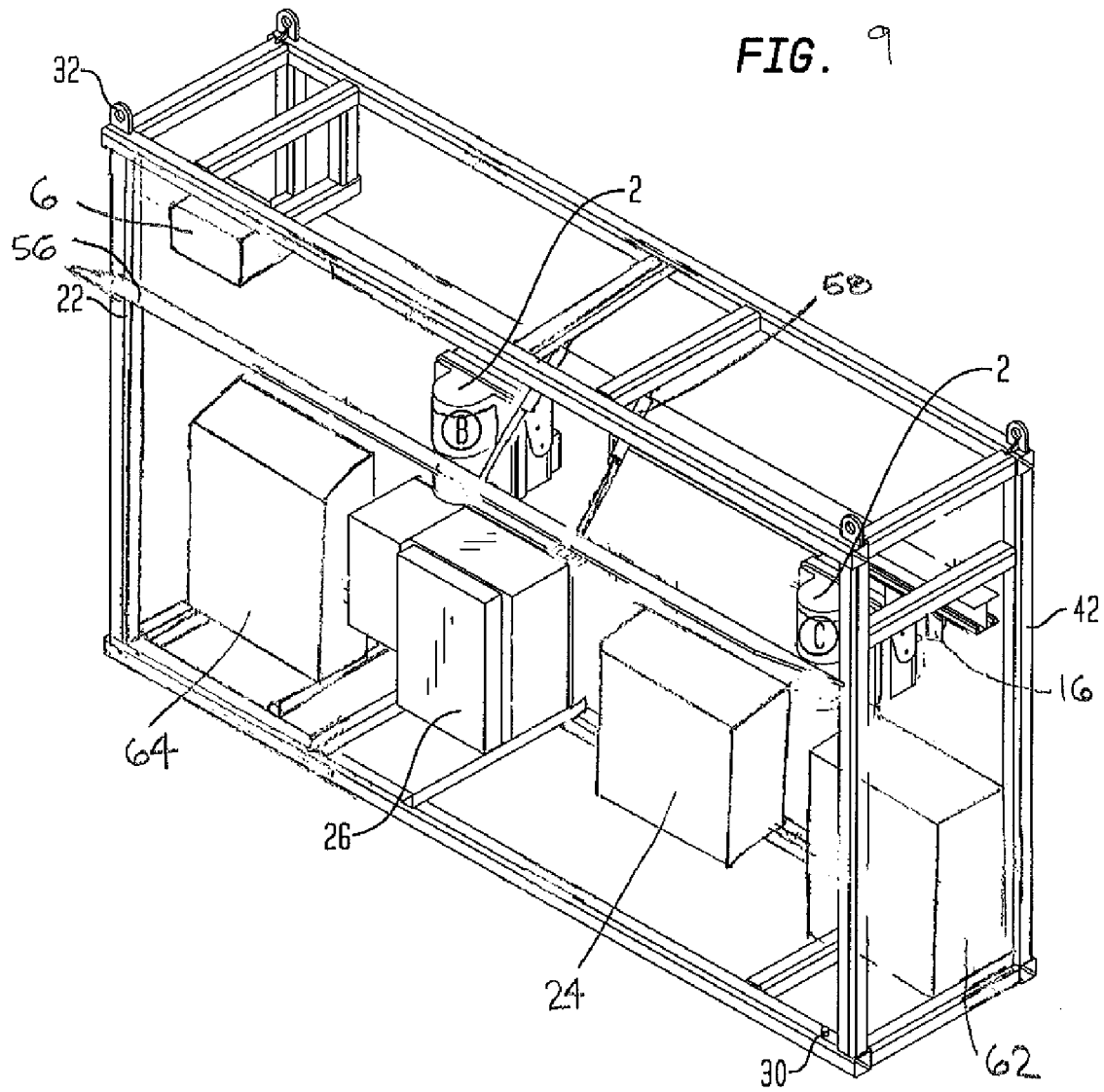
FIG. 9 shows a parallel perspective view of the front of the system of FIG. 8 showing the laser in, the first scanning position and the second scanning position.

The system for measuring wear in a refractory lining can have a movable shield 56 which is opened and closed by air cylinder 58 as seen in FIGS. 8 and 9. Air cylinder 58 is connected to lug 60 on the interior of shield 56.

The system for measuring a refractory lining of the present invention can carry out the method as described in International PCT Publication WO2007064928, which is incorporated by reference in its entirety and is now U.S. Pat. No. 7,924,438, which is incorporated by reference in its entirety can be carried out in some embodiments on the present invention.

Although the invention has been described above with reference to the examples according to the accompanying drawings, it will be obvious that the invention is not restricted thereto but can be modified in many ways within the scope of the inventive concept disclosed in the appended claims.

What is claimed is:

1. A system for measuring a refractory lining of a vessel by an electromagnetic radiation emitting and receiving device comprising:
   (a) a means for scanning by the electromagnetic radiation emitting and receiving device from a first scanning position at least a first mark having a known position in a coordinate system based on the vessel, a second mark and a third mark and for scanning from a second scanning position at least a plurality of points on the refractory lining;
   (b) a means for moving the electromagnetic radiation emitting and receiving device along a predetermined path from the first scanning position to the second scanning position where the electromagnetic radiation emitting and receiving device scans at least two of the first mark, second mark and third mark in the coordinate system of the vessel;
   (c) a means for determining an initial reference position and heading of the electromagnetic radiation emitting and receiving device in the coordinate system in relation to the first mark, second mark and third mark and for determining positions of the at least two of the first mark, second mark and third mark which were scanned from the second scanning position based on the scanning of the at least two marks from the first scanning position and for determining an internal contour of the refractory lining of the vessel from data generated by the scanning of the plurality of points on the internal contour of the refractory lining of the vessel;
   (d) a means for cooling the electromagnetic radiation emitting and receiving device; and
   (e) a means for supporting the electromagnetic radiation emitting and receiving device, the means for cooling the electromagnetic radiation emitting and receiving device, the means for moving the electromagnetic radiation emitting and receiving device from the first scanning position and to the second scanning position.

2. The system according to claim 1 wherein the cooling means is a peltier cooler.

3. The system according to claim 1 wherein the system further comprises a means for measuring tilt angle of the vessel.

4. The system according to claim 1 further comprising a means for detachably mounting the system on a support surface which supports the system.

5. The system according to claim 1 further comprising a means for displaying an image of the contour of the refractory lining based on the data generated from the scanning of the internal contour of the refractory lining of the vessel.

6. The system according to claim 1 wherein the means for moving the electromagnetic radiation emitting and receiving device from the first scanning position to the second scanning position is a mechanical guiding means.

7. The system according to claim 6 further comprising a means for determining when the electromagnetic radiation emitting and receiving device is at the second scanning position.

8. The system according to claim 7 wherein the means for determining when the electromagnetic radiation emitting and receiving device is at the second scanning position is a positioning means.

9. The system according to claim 8 wherein the means for moving the electromagnetic radiation emitting and receiving device from the first scanning position to the second scanning position moves the electromagnetic radiation emitting and receiving device from a park position to the first scanning position.

10. The system according claim 9 further comprising a means for shielding the electromagnetic radiation emitting and receiving device from heat or thermal radiation from the vessel when the electromagnetic radiation emitting and receiving device is in the park position.

11. A system for measuring a refractory lining of a vessel by an electromagnetic radiation emitting and receiving device comprising:
   (a) a means for scanning by the electromagnetic radiation emitting and receiving device from a first scanning position at least a first mark having a known position in a coordinate system based on the vessel, and a second mark and a third mark and for scanning from a second scanning position at least a plurality of points on the refractory lining;
   (b) a means for moving the electromagnetic radiation emitting and receiving device along a predetermined path from a park position to the first scanning position and to the second scanning position where the electromagnetic radiation emitting and receiving device scans at least two of the first mark, second mark and third mark in the coordinate system of the vessel;
   (c) a means for determining an initial reference position and heading of the electromagnetic radiation emitting and receiving device in the coordinate system in relation to the first mark, second mark and third mark and for determining positions of the at least two of the first mark, second mark and third mark which were scanned from the second scanning position based on the scanning of the at least two marks from the first scanning position and for determining an internal contour of the refractory lining of the vessel from data generated by the scanning of the plurality of points on the internal contour of the refractory lining of the vessel;

(d) a means for determining when the electromagnetic radiation emitting and receiving device is at the second scanning position;

(e) a means for shielding the electromagnetic radiation emitting and receiving device from heat or thermal radiation from the vessel when the electromagnetic radiation emitting and receiving device is in the park position;

(f) a means for cooling the electromagnetic radiation emitting and receiving device;

(g) a means for displaying an image of the internal contour of the refractory lining based on the data generated from the scanning of the internal contour of the refractory lining of the vessel; and (h) a means for supporting the electromagnetic radiation emitting and receiving device, the means for cooling the electromagnetic radiation emitting and receiving device, the means for moving the electromagnetic radiation emitting and receiving device from the park position to the first scanning position and to the second scanning position, and the means for shielding the electromagnetic radiation emitting and receiving device.

12. A system for measuring a refractory lining of a vessel by an electromagnetic radiation emitting and receiving device comprising:

(a) a means for scanning by the electromagnetic radiation emitting and receiving device from a first scanning position at least a first mark having a known position in a coordinate system based on the vessel, and a second mark and for scanning from a second position at least a plurality of points on the refractory lining;

(b) a means for moving the electromagnetic radiation emitting and receiving device along a predetermined path from the first scanning position to a second scanning position where the electromagnetic radiation emitting and receiving device scans at least one of the first mark and second mark;

(c) a means for determining an initial reference position and heading of the electromagnetic radiation emitting and receiving device in the coordinate system in relation to the first mark and second mark and for determining positions of the at least one of the first mark and second mark which was scanned from the second scanning position based on the scanning of the at least one mark from the first scanning position and for determining an internal contour of the refractory lining of the vessel from data generated by the scanning of the plurality of points on the internal contour of the refractory lining of the vessel;

(d) a means for determining when the electromagnetic radiation emitting and receiving device is at the second scanning position;

(e) a means for shielding the electromagnetic radiation emitting and receiving device from heat or thermal radiation from the vessel when the electromagnetic radiation emitting and receiving device is in the first scanning position and the second scanning position, wherein the means for shielding the electromagnetic radiation emitting and receiving device is movable from a position in which the first scanning position and second scanning position are shielded to a position in which the first scanning position and second scanning position are not shielded by the means for shielding the electromagnetic radiation emitting and receiving device;

(f) a means for cooling the electromagnetic radiation emitting and receiving device;

(g) a means for displaying an image of the internal contour of the refractory lining based on the data generated from the scanning of the internal contour of the refractory lining of the vessel; and (h) a means for supporting the electromagnetic radiation emitting and receiving device, the means for cooling the electromagnetic radiation emitting and receiving device, the means for moving the electromagnetic radiation emitting and receiving device from the first scanning position to the second scanning position, and the means for shielding the electromagnetic radiation emitting and receiving device.

13. A system for measuring a refractory lining of a vessel by an electromagnetic radiation emitting and receiving device comprising:

(a) a means for scanning by the electromagnetic radiation emitting and receiving device from a first scanning position at least a first mark having a known position in a coordinate system based on the vessel and a second mark and for scanning from a second scanning position at least a plurality of points on the refractory lining;

(b) a means for moving the electromagnetic radiation emitting and receiving device along a predetermined path from the first scanning position to the second scanning position where the electromagnetic radiation emitting and receiving device scans at least one of the first mark and second mark;

(c) a means for determining an initial reference position and heading of the electromagnetic radiation emitting and receiving device in the coordinate system in relation to the first mark and second mark and for determining positions of the at least one of the first mark and second mark which was scanned from the second scanning position based on the scanning of the at least one mark from the first scanning position, and for determining an internal contour of the refractory lining of the vessel from data generated by the scanning of the plurality of points on the internal contour of the refractory lining of the vessel;

(d) a means for cooling the electromagnetic radiation emitting and receiving device; and (e) a means for supporting the electromagnetic radiation emitting and receiving device, the means for cooling the electromagnetic radiation emitting and receiving device, the means for moving the electromagnetic radiation emitting and receiving device from the first scanning position and to the second scanning position.

14. The system according to claim 13 further comprising a means for determining when the electromagnetic radiation emitting and receiving device is at the second scanning position.

15. The system according to claim 13 wherein the means for determining when the electromagnetic radiation emitting and receiving device is at the second scanning position is a positioning means.

16. The system according to claim 13 further comprising a means for shielding the electromagnetic radiation emitting and receiving device from heat or thermal radiation.

17. The system according to claim 13 wherein the system further comprises a means for measuring a tilt angle of the vessel.

18. The system according to claim 13 wherein the means for moving the electromagnetic radiation emitting and receiving device from the first scanning position to the second scanning position is a mechanical guiding means.

19. The system according to claim 13 wherein the vessel is a ladle, a basic oxygen furnace or other container used in industrial applications.

20. The system according to claim 13 wherein the first mark is a permanent mark.

21. The system according to claim 13 wherein the means for moving the electromagnetic radiation emitting and receiving device along a predetermined path is capable of moving the electromagnetic radiation emitting and receiving device from a park position to the first scanning position.

22. The system according to claim 20 wherein the second mark is either being positioned outside the vessel or on or within the vessel.

23. The system according to claim 21 further comprising a means for shielding the electromagnetic radiation emitting and receiving device from heat or thermal radiation from the vessel when the electromagnetic radiation emitting and receiving device is in the park position.

* * * * *